(12) United States Patent
Kucera

(10) Patent No.: US 6,902,766 B1
(45) Date of Patent: Jun. 7, 2005

(54) TWO-PART AQUEOUS METAL PROTECTION TREATMENT

(75) Inventor: Helmut W. Kucera, West Springfield, PA (US)

(73) Assignee: Lord Corporation, Cary, NC (US)

( * ) Notice: Subject to any disclaimer, the term of this patent is extended or adjusted under 35 U.S.C. 154(b) by 455 days.

(21) Appl. No.: 09/627,312

(22) Filed: Jul. 27, 2000

(51) Int. Cl.$^7$ .............................................. B05D 3/02
(52) U.S. Cl. ................ 427/372.2; 427/379; 427/385.5; 427/388.1; 427/388.2; 427/388.4; 427/409; 524/541; 524/594; 524/595; 524/596; 524/609; 524/841; 525/390; 525/397; 525/480; 525/505
(58) Field of Search ................................ 428/457, 458, 428/460, 461; 525/390, 397, 480, 505; 427/372.2, 385.5, 388.1, 388.2, 388.3, 388.4, 409, 379; 524/541, 594, 595, 596, 609, 841

(56) References Cited

U.S. PATENT DOCUMENTS

| | | | |
|---|---|---|---|
| 2,502,441 A | 4/1950 | Dodd et al. ................. 148/6.15 |
| 3,258,388 A | 6/1966 | Coleman et al. ............ 161/218 |
| 3,258,389 A | 6/1966 | Coleman et al. ............ 161/218 |
| 3,615,895 A | 10/1971 | Von Freyhold et al. . 148/6.15 R |
| 4,003,761 A | 1/1977 | Gotta et al. ............ 148/6.15 R |
| 4,039,353 A | 8/1977 | Kulick et al. .......... 148/6.15 R |
| 4,119,587 A | 10/1978 | Jazenski et al. ........... 260/3.53 |
| 4,149,909 A | 4/1979 | Hamilton .................... 148/6.17 |
| 4,165,242 A | 8/1979 | Kelly et al. ................. 148/6.15 |
| 4,167,500 A | 9/1979 | Jazenski et al. ............ 260/29.3 |
| 4,220,485 A | 9/1980 | Howell et al. ........... 148/6.15 Z |
| 4,293,349 A | 10/1981 | Pedrazzini ............. 148/6.15 R |
| 4,376,000 A | 3/1983 | Lindert ................... 148/6.15 R |
| 4,414,350 A | 11/1983 | Hall ........................... 524/320 |
| 4,483,962 A | 11/1984 | Sadowski ................... 524/552 |
| 4,529,487 A | 7/1985 | Hsu et al. ................... 204/37.1 |
| 4,612,236 A | 9/1986 | Hsu et al. ................... 428/216 |
| 4,755,418 A * | 7/1988 | DebRoy et al. ............. 428/215 |
| 4,780,524 A * | 10/1988 | Dobbelstein et al. ....... 528/104 |
| 4,795,506 A | 1/1989 | Sokalski ................. 148/6.14 R |
| 4,944,813 A | 7/1990 | Hosemann et al. ......... 148/260 |
| 4,970,264 A | 11/1990 | Lindert et al. ........... 525/328.8 |
| 4,994,521 A | 2/1991 | Broadbent ................... 524/575 |
| 5,011,551 A | 4/1991 | Emeric et al. .............. 148/248 |
| 5,036,122 A | 7/1991 | Auerbach et al. ........... 524/259 |
| 5,061,523 A | 10/1991 | Shachat ...................... 427/377 |
| 5,093,203 A | 3/1992 | Mowrey et al. ............ 428/462 |
| 5,116,469 A | 5/1992 | Yahalom .................... 204/147 |
| 5,128,403 A | 7/1992 | Warren et al. .............. 524/430 |
| 5,175,215 A | 12/1992 | Weih .......................... 525/292 |
| 5,200,455 A | 4/1993 | Warren ....................... 524/413 |
| 5,200,459 A | 4/1993 | Weih et al. ................. 524/459 |
| 5,234,509 A | 8/1993 | Tull ............................ 148/246 |
| 5,268,404 A | 12/1993 | Mowrey ..................... 524/236 |
| 5,275,848 A | 1/1994 | Mito et al. .................. 427/409 |
| 5,281,638 A | 1/1994 | Mowrey ..................... 524/105 |
| 5,300,555 A | 4/1994 | Weih et al. ................. 524/571 |
| 5,427,632 A | 6/1995 | Dolan ......................... 148/259 |
| 5,427,863 A | 6/1995 | Siebert ....................... 428/463 |
| 5,472,523 A | 12/1995 | Harelstad ................... 148/255 |
| 5,496,884 A | 3/1996 | Weih et al. ................. 524/503 |
| 5,500,460 A | 3/1996 | Ahmed et al. .............. 523/402 |
| 5,653,790 A | 8/1997 | Fotinos et al. ........... 106/14.12 |
| 5,691,048 A | 11/1997 | Roberto et al. ............. 428/334 |
| 5,711,996 A | 1/1998 | Claffey .................. 427/388.43 |
| 5,728,235 A | 3/1998 | Boulos et al. .............. 148/257 |
| 5,733,386 A | 3/1998 | Yoshida et al. ............. 148/251 |
| 5,797,987 A | 8/1998 | Rossio .................... 106/14.12 |
| 5,851,371 A | 12/1998 | Steinbrecher et al. ....... 204/486 |
| 5,868,820 A | 2/1999 | Claffey .................... 106/14.44 |
| 5,868,874 A | 2/1999 | Rossio ........................ 148/262 |
| 5,891,268 A | 4/1999 | Hacias et al. ............... 148/246 |
| 5,908,911 A * | 6/1999 | Nakashio et al. ............. 528/45 |
| 6,383,307 B1 * | 5/2002 | Kucera et al. .............. 148/251 |

FOREIGN PATENT DOCUMENTS

| | | |
|---|---|---|
| WO | WO 93/15154 | 8/1993 |
| WO | WO 97/07163 | 2/1997 |
| WO | WO 99/37713 * | 7/1999 |
| WO | WO 99/37722 | 7/1999 |

OTHER PUBLICATIONS

Moles, Dr. Peter J. "The Use of Zirconium in Surface Coatings" Mel Chemicals Data Sheet 117, 2003.

* cited by examiner

Primary Examiner—Monique R. Jackson
(74) Attorney, Agent, or Firm—Miles B. Dearth

(57) ABSTRACT

A two-part metal protection composition includes: an aqueous metal treatment conversion coating component that includes an admixture of an acid and a coating forming component; and an aqueous protective coating component that is applied over metal treated with the aqueous metal treatment conversion coating component and includes an admixture of a blister suppressing agent and an organic film forming protective component. The aqueous metal treatment conversion coating component may contain an accelerator, such as hydroxylamine. In a preferred embodiment, the blister suppressing agent is an organic oxidizing agent that includes one or more of nitroguanidine; aromatic nitrosulfonates, Naphthol Yellow S; and picric acid (trinitrophenol). A method for treating a metallic surface includes: (a) applying an aqueous metal treatment conversion coating component described above; and (b) applying an aqueous protective coating component, described above, to the surface that has at least been partially treated with the aqueous metal treatment conversion coating component. A method for bonding an elastomeric substrate surface to a metallic substrate surface includes: (a) applying an aqueous metal treatment conversion coating component, described above, to the surface; (b) applying an aqueous coating or primer composition, described above, to the surface that has at least been partially treated with the aqueous metal treatment conversion coating component; and (c) applying an adhesive overcoat to effect bonding of the metallic substrate to the elastomeric substrate.

45 Claims, No Drawings

TWO-PART AQUEOUS METAL PROTECTION TREATMENT

BACKGROUND OF THE INVENTION

1. Field of Invention

The present invention relates to metal protection compositions. More particularly, the present invention relates to two-part coating compositions for protecting metals, methods for applying two-part coating composition to metals and metals having the two-part coating composition.

2. Description of the Related Art

Many methods and composition for protecting metal surfaces exposed to air and water, including salt water, are currently in use. Methods for preparing metal surfaces for subsequent uses, such as applications of adhesives are also known. Generally, before a primer or other coating is applied to a metal surface, it is desirable to treat a bare metal surface to prevent corrosion. It is well known that metal surfaces are subject to corrosion and degradation. A known process for treating metal surfaces before the application of primer or other coatings is phosphating or conversion coating, a procedure by which a water-insoluble film of metal phosphate and/or metal oxide is formed on the metal surface by treatment with an acid such phosphoric acid or acid phosphate salts. The conversion coating can also include resins, such as phenolic based resins to improve corrosion resistance. U.S. Pat. No. 5,011,551 relates to a metal conversion coating composition that includes an aliphatic alcohol, phosphoric acid, an alkali nitrate, tannic acid and zinc nitrate. U.S. Pat. No. 4,293,349 relates to a steel surface protective coating composition that includes pyrogallic acid glucoside, phosphoric acid, phosphates of bivalent transition metals such as Zn or Mn, Zn or Mn nitrate, and, optionally, formaldehyde.

Coatings that form by autodeposition are also generally known in the art. An autodeposition composition generally includes an aqueous solution of an acid, an oxidizing agent and a dispersed resin. Immersion of a metallic surface in an autodeposition composition produces what is said to be a self-limiting protective coating on a metal substrate. The general principles and advantages of autodeposition are explained in a multitude of patents assigned to Parker Amchem and/or Henkel (see, for example, U.S. Pat. Nos. 4,414,350; 4,994,521; 5,427,863; 5,061,523 and 5,500,460).

U.S. Pat. No. 5,691,048 includes phosphoric acid in a list for possible acids in an autodepositing composition, but hydrofluoric acid is the preferred acid. This patent also lists hydrogen peroxide, chromic acid, potassium dichromate, nitric acid, sodium nitrate, sodium persulfate, ammonium persulfate, sodium perborate and ferric fluoride as possible oxidizing agents. Hydrogen peroxide and ferric fluoride are preferred.

The use of accelerating agents, including oxidizing and reducing accelerators to accelerate the deposition of the conversion coating is also known. See, e.g., Freeman, *Phosphating and Metal Pretreatment*, Industrial Press Inc., 1986, pages 19 to 25. The accelerating agents are believed to increase the rate of deposition by reacting with hydrogen formed on the metal surface during attack by acid, thus, preventing polarization of the treated metal. The use of accelerators is also disclosed in e.g., U.S. Pat. Nos. 4,149,909; 5,427,632; and 5,711,996. The oxidizers disclosed in U.S. Pat. No. 5,691,048 are also used as accelerators.

The use of some accelerators in applications that involve the application of a subsequent coating, such as a primer coating can cause blister formation which results in decreased corrosion resistance and cosmetic defects. Also, the use of high levels of accelerators in metal treatment conversion coatings can cause application difficulties with the conversion coating.

SUMMARY OF THE INVENTION

One object of the invention is to overcome the disadvantages of the known art described above. Another object of the invention is to provide a metal treatment composition and method that avoids or reduces blister formation upon application of a protective coating on a metal surface that has been previously subjected to a conversion coating metal treatment. Yet another objective of the invention is to reduce and even eliminate the need for accelerators in the metal treatment conversion coating prior to the application of a protective coating.

There has been provided according to one aspect of the invention a two-part metal protection composition that includes: an aqueous metal treatment conversion coating component that includes an admixture of an acid and a coating forming component; and an aqueous protective coating component that is applied over metal treated with the aqueous metal treatment conversion coating component and includes an admixture of a blister suppressing agent and an organic film forming protective component. The aqueous metal treatment conversion coating component may contain an accelerator, such as hydroxylamine. In a preferred embodiment, the blister suppressing agent is an organic oxidizing agent that includes one or more of nitroguanidine; aromatic nitrosulfonates, Naphthol Yellow S; and picric acid (trinitrophenol).

According to another aspect of the invention, there has been provided a method for treating a metallic surface that includes: (a) applying an aqueous metal treatment conversion coating component that includes an admixture of an acid and a coating forming component; and (b) applying an aqueous protective coating component to the surface that has at least been partially treated with the aqueous metal treatment conversion coating component and includes an admixture of a blister suppressing agent and an organic film forming protective component. The aqueous metal treatment conversion coating component may further include an accelerator.

According to still another aspect of the invention, there has been provided a method for bonding an elastomeric substrate surface to a metallic substrate surface that includes: (a) applying an aqueous metal treatment conversion coating component to the surface wherein the aqueous metal treatment conversion coating component includes an admixture of an acid and a coating forming component; (b) applying an aqueous coating or primer composition to the surface that has at least been partially treated with the aqueous metal treatment conversion coating component and includes an admixture of a blister suppressing agent and an organic film forming protective component; and (c) applying an adhesive overcoat to effect bonding of the metallic substrate to the elastomeric substrate. The aqueous metal treatment conversion coating component may further include an accelerator.

Further objects, features and advantages of the present invention will become apparent from consideration of the preferred embodiments which follows.

DETAILED DESCRIPTION OF THE PREFERRED EMBODIMENTS

As used herein, all percentages are weight percentages based on the total dry weight of the composition. Dry weight being the total amount of solids in the system, excluding water. For example, for 10 grams of 85% phosphoric acid would have 8.5 grams of solids. Unless otherwise indicated herein, all measurements, such as pH, are taken at room temperature, i.e., 25° C.

The present invention is directed to a two-part metal protection system. The first part of the system includes an aqueous metal treatment conversion coating component. As used herein, "conversion coating" is defined as a treatment of a metal substrate with a liquid that results in the surface layer of the metal substrate being chemically altered to form a protective layer.

The first component of the aqueous metal treatment conversion coating component includes an acid. The acid can be any acid that is capable of reacting with a metal to generate multivalent ions of that metal. Illustrative acids include hydrofluoric acid, phosphoric acid, sulfuric acid, hydrochloric acid, phosphonic acid, phosphorous acid, organo-phosphonic acids, organo-phosphorous acid, organo-phosphonate acid hypophosphorous acid, inorganic and organic phosphoric acid esters and nitric acid. In the case of steel the multivalent ions will be ferric and/or ferrous ions. Aqueous solutions of phosphoric acid are preferred. When the acid is mixed into the composition the respective ions are formed and exist as independent species in addition to the presence of the free acid. In other words, in the case of phosphoric acid, phosphate ions and free phosphoric acid co-exist in the formulated final multi-component composition. The acid preferably is present in an amount of 10–90 wt % preferably 25–50 wt %, based on the dry weight of the metal treatment conversion coating component.

The aqueous metal treatment conversion coating component also includes a coating forming component. The coating forming component can be organic or inorganic and is used to fix free acid to the surface during processing. Examples of inorganic coating forming components include ions of zinc, manganese, chromium, sodium, cadmium, copper, lead, calcium, cobalt, nickel, borate, sililcates, titanates, and sol-gels.

The coating forming component is preferably an organic component. A preferred organic component includes a phenolic compound. "Phenolic compound" is defined as a compound that includes at least one hydroxy functional group attached to a carbon atom of an aromatic ring. Phenolic compounds can also include resins that include phenolic monomer units. Illustrative phenolic compounds include unsubstituted phenol per se, substituted phenols such as alkylated phenols and multi-hydroxy phenols, and hydroxy-substituted multi-ring aromatics. Illustrative alkylated phenols include methylphenol (also known as cresol), dimethylphenol (also known as xylenol), 2-ethylphenol, pentylphenol and tert-butyl phenol. Phenolic compounds such as tannic acids can also be used.

In a preferred embodiment, the organic component of the metal treatment conversion coating component includes an autodepositable component. The autodepositable component is any material that enables (either by itself or in combination with other components of the metal treatment conversion coating component) the metal treatment conversion coating component to autodeposit on a metal substrate. Preferably, the autodepositable component is any water dispersible or water soluble resin that is capable of providing autodeposition ability to the metal treatment conversion coating component. These resins include those derived ethylenicially unsaturated monomers such as polyvinylidene chloride, polyvinyl chloride, polyethylene, acrylic, acrylontrile, polyvinyl acetate and styrene-butadiene (see U.S. Pat. Nos. 4,414,350; 4,994,521; and 5,427,863; and PCT published application no. WO 93/15154). Urethane and polyester resins are also mentioned as being useful. Certain epoxy and epoxy-acrylate resins are also believed to be useful autodeposition resins (see U.S. Pat. No. 5,500,460 and PCT published application no. WO 97/07163). All these references are incorporated herein by reference in their entireties.

A particularly preferred phenolic compound for autodeposition can include those disclosed in pending application Ser. No. 09/235,201 filed Jan. 22, 1999 now U.S. Pat. No. 6,383,307 which is incorporated herein by reference in its entirety. The phenolic compound described in this application is an aqueous dispersed phenolic novolak resins. This resin is responsible for the autodeposition characteristic of the metal treatment composition.

The preferred phenolic novolak resin dispersion can be obtained by initially reacting or mixing a phenolic resin precursor and a modifying agent—theoretically via a condensation reaction between the phenolic resin precursor and the modifying agent.

One functional moiety of the modifying agent provides the ionic pendant group that enables stable dispersion of the phenolic resin. Without the ionic pendant group, the phenolic resin would be unable to maintain a stable dispersion in water. Since the ionic pendant group provides for the stability of the dispersion there is no need, or at the most a minimal need, for surfactants. The presence of surfactants in an aqueous composition is a well-known hindrance to the composition's performance.

The other important functional moiety in the modifying agent enables the modifying agent to react with the phenolic resin precursor. The modifying agent can contain more than one ionic pendant group and more than one reaction-enabling moiety.

Incorporation of aromatic sulfonate functional moieties into the phenolic resin structure via condensation is the preferred method of providing the ionic pendant groups. Accordingly, one class of ionic moieties are substituents on an aromatic ring that include a sulfur atom covalently or ionically bonded to a carbon atom of the aromatic ring. Examples of covalently bound sulfur-containing substituents are sulfonate ($—S(O)_2O^-M^+$), sulfinate ($—S(O)O^-M^+$), sulfenate ($—SO^-M^+$) and oxysulfonate ($—OS(O)_2O^-M^+$), wherein M can be any monovalent ion such as Na, Li, K, or $NR^1_3$ (wherein $R^1$ is hydrogen or an alkyl). Another example of a covalently bound substituent is sulfate ion. Sulfonate is the preferred ionic group. The modifying agent should not include or introduce any multivalent ions into the phenolic resin dispersion since it is expected that the presence of multivalent ions would cause the phenolic resin to precipitate rather than remain dispersed.

The reaction-enabling functional moiety of the modifying agent can be any functional group that provides a site on the modifying agent for undergoing condensation with a phenolic resin. If the phenolic resin precursor is a resole, the modifying agent reacts with an alkylol or benzyl ether group of the resole. If the modifying agent is aromatic, the reaction-enabling functional moiety is a substituent on the aromatic ring that causes a site on the ring to be reactive to the alkylol or benzyl ether of the resole precursor. An example of such a substituent is a hydroxy or hydroxyalkyl, with hydroxy being preferred. The hydroxy- or hydroxyalkyl-substituted aromatic modifying agent is reactive at a site ortho and/or para to each hydroxy or hydroxyalkyl substituent. In other words, the aromatic modifying agent is bonded to, or incorporated into, the phenolic resin precursor at sites on the aromatic ring of the modifying agent that are ortho and/or para to a hydroxy or hydroxyalkyl substituent. At least two reaction-enabling functional moieties are preferred to enhance the reactivity of the aromatic modifying agent with the phenolic resin precursor.

Alternatively, the reaction-enabling functional moiety of the modifying agent can be a formyl group (—CHO), preferably attached to a carbon atom of an aromatic ring. In this instance, the phenolic resin precursor is a novolak rather than a resole. The novolak precursor is reacted via an acid catalyzed aldehyde condensation reaction with the formyl group-containing modifying agent so that the formyl group forms a divalent methylene linkage to an active site on an aromatic ring of the backbone structure of the novolak precursor. Consequently, the modifying agent structure (including the ionic moiety) is incorporated into the phenolic structure through the generated methylene linkage. Examples of such formyl group-containing modifying agents include 2-formylbenzene sulfonate, 5-formylfuran sulfonate and $(R)(SO_3)CH—CH_2—C(O)(H)$ compounds wherein R is $C_1-C_4$ alkyl groups.

Another alternative reaction-enabling functional moiety could be a diazo group ($—N_2^+$), preferably attached to a carbon atom of an aromatic ring. In this instance, the phenolic resin precursor is a novolak rather than a resole. The novolak precursor is reacted via a diazo coupling reaction with the diazo group-containing modifying agent so that the diazo group forms a divalent diazo linkage (—N=) to an active site on an aromatic ring of the backbone structure of the novolak precursor. Consequently, the modifying agent structure (including the ionic moiety) is incorporated into the phenolic structure through the diazo linkage. An example of such diazo modifying agents is 1-diazo-2-naphthol-4-sulfonic acid.

The modifying agent also can optionally include a functional moiety that is capable of chelating with a metal ion that is present on a substrate surface on which the phenolic resin dispersion is applied. The chelating group remains as a residual group after the condensation of the phenolic resin precursor and the aromatic modifying agent. Typically, the chelating group is a substituent on the aromatic ring that is capable of forming a 5- or 6-membered chelation structure with a metal ion. Examples of such substituents include hydroxy and hydroxyalkyl, with hydroxy being preferred. At least two such functional groups must be present on the modifying agent molecule to provide the chelating. In the case of an aromatic modifying agent, the chelating groups should be located in an ortho position relative to each other. A significant advantage is that hydroxy or hydroxyalkyl substituents on the aromatic modifying agent can serve two roles—condensation enablement and subsequent metal chelating.

An aromatic modifying agent is particularly advantageous. Preferably, the ionic group and the reaction-enabling moiety are not substituents on the same aromatic ring. The ionic group, particularly sulfonate, appears to have a strong deactivating effect on condensation reactions of the ring to which it is attached. Consequently, an ionic group attached to the same ring as the reaction-enabling moiety would not allow the modifying agent to readily react with the phenolic resin. However, it should be recognized that this consideration for the location of the ionic and reaction-enabling moieties is not applicable to the formyl group-containing modifying agent and diazo modifying agent.

A preferred structure for the aromatic modifying agent is represented by formulae Ia or Ib below:

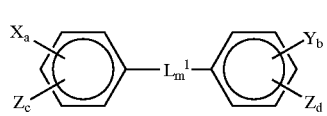

Formula Ia

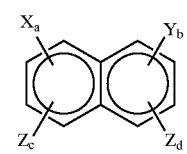

Formula Ib wherein X is the ionic group; Y is the reaction-enabling substituent; Z is the chelating substituent; $L^1$ is a divalent linking group such as an alkylene radical (for example, methylene) or a diazo (—N=N—); a is 1; b is 1 to 4; m is 0 or 1; and c and d are each independently 0 to 3, provided there are not more than 4 substituents on each aromatic ring. If a chelating group Z is present it is positioned ortho to another chelating group Z or to Y. It should be recognized that the reaction-enabling substituent Y may also act as a chelating substituent. In this instance, the aromatic modifying agent may not include an independent chelating substituent Z. An aromatic modifying agent according to formulae Ia or Ib could also include other substituents provided they do not adversely interfere with the ionic group or the condensation reaction.

Illustrative aromatic modifying agents include salts of 6,7-dihydroxy-2-napthalenesulfonate; 6,7-dihydroxy-1-naphthalenesulfonate; 6,7-dihydroxy-4-naphthalenesulfonate; Acid Red 88; Acid Alizarin Violet N; Erichrome Black T; Erichrome Blue Black B; Brilliant Yellow; Crocein Orange G; Biebrich Yellow; and Palatine Chrome Black 6BN. 6,7-dihydroxy-2-naphthalenesulfonate, sodium salt is the preferred aromatic modifying agent.

It should be recognized that the preferred sulfonate modification contemplated herein involves an indirect sulfonation mechanism. In other words, the aromatic modifying agent includes a sulfonate group and is reacted with another aromatic compound (the phenolic resin precursor) to obtain the chain extended, sulfonate-modified phenolic resin product. This indirect sulfonation is distinctly different than direct sulfonation of the phenolic resin precursor.

Any phenolic resin could be employed as the phenolic resin precursor, but it has been found that resoles are especially suitable. The resole precursor should have a sufficient amount of active alkylol or benzyl ether groups that can initially condense with the modifying agent and then undergo further subsequent condensation. Of course, the phenolic resin precursor has a lower molecular weight than the final dispersed resin since the precursor undergoes condensation to make the final dispersed resin. Resoles are prepared by reacting a phenolic compound with an excess of an aldehyde in the presence of a base catalyst. Resole resins are usually supplied and used as reaction product mixtures of monomeric phenolic compounds and higher molecular weight condensation products having alkylol (—$ArCH_2$—OH) or benzyl ether termination (—$ArCH_2$—$CH_2Ar$), wherein Ar is an aryl group. These resole mixtures or prepolymers (also known as stage A resin) can be transformed into three-dimensional, crosslinked, insoluble and infusible polymers by the application of heat.

The reactants, conditions and catalysts for preparing resoles suitable for the resole precursor of the present invention are well-known. The phenolic compound can be any of those previously listed or other similar compounds, although multi-hydroxy phenolic compounds are undesirable. Particularly preferred phenolic compounds for making the resole precursor include phenol per se and alkylated phenol. The aldehyde also can be any of those previously listed or other similar compounds, with formaldehyde being preferred. Low molecular weight, water soluble or partially water soluble resoles are preferred as the precursor because such resoles maximize the ability to condense with the modifying agent. The F/P ratio of the resole precursor should be at least 0.90. Illustrative commercially available resoles that are suitable for use as a precursor include a partially water soluble resole available from Georgia Pacific under the trade designation BRL 2741 and a partially water soluble resoles available from Schenectady International under the trade designations HRJ11722 and SG3100.

Preferably, the dispersed novolak is produced by reacting or mixing 1 mol of modifying agent(s) with 2–20 mol of phenolic resin (preferably resole) precursor(s) and, preferably, 2–20 mol of multi-hydroxy phenolic compound (s). An aldehyde compound, preferably formaldehyde, is also required to make the novolak. The aldehyde compound can optionally be added as a separate ingredient in the initial reaction mixture or the aldehyde compound can be generated in situ from the resole precursor. The resole precursor (s), multi-hydroxy phenolic compound(s) and modifying agent(s) co-condense to form the dispersed novolak. The reaction typically is acid catalyzed with an acid such as phosphoric acid. The F/P ratio of aldehyde compound(s) to combined amount of resole precursor(s) and multi-hydroxy phenolic compound(s) in the initial reaction mixture preferably is less than 0.9. Preferably, synthesis of the dispersed novolak is a two stage reaction. In the first stage, the resole precursor(s) is reacted with the modifying agent(s) and, optionally, a small amount of multi-hydroxy phenolic compound(s). Once this first stage reaction has reached the desired point (i.e. the resin can be readily formed into a translucent dispersion), the acid catalyst and a greater amount of multi-hydroxy phenolic compound(s) is added to the reaction mixture. Pyrocatechol (also simply known as catechol) is a preferred multi-hydroxy phenolic compound for reacting in the first stage and resorcinol is a preferred multi-hydroxy phenolic compound for reacting in the second stage.

Hydrophilic novolaks typically have a hydroxy equivalents of between 1 and 3 per aromatic ring. Preferably, dispersed hydrophilic novolaks according to the invention have a hydroxy equivalents of 1.1 to 2.5, more preferably 1.1 to 2.0. The hydroxy equivalents are calculated based on the amount of multi-hydroxy phenolic compounds used to make the novolak.

According to a preferred embodiment, the dispersed phenolic resin reaction product contains a mixture of oligomers having structures believed to be represented by the following formulae IIa or IIb:

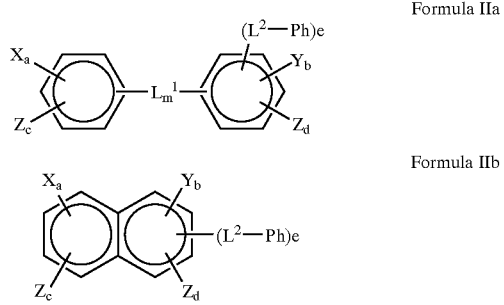

Formula IIa

Formula IIb wherein X, Y, Z and $L^1$ and subscripts a, b, c, d and m are the same as in formulae Ia and Ib, e is 1 to 6, $L^2$ is a divalent linking group and Ph is the phenolic resin backbone structure, provided the —($L^2$—Ph) group(s) is(are) ortho or para to a Y group. $L^2$ depends upon the particular phenolic resin, but typically is a divalent alkylene radical such as methylene (—$CH_2$—) or oxydimethylene (—$CH_2$—O—$CH_2$—). Preferably, e is 2 and the —($L^2$—Ph) groups are in para position to each other.

According to a preferred embodiment wherein the phenolic resin is a novolak and the modifying agent is a naphthalene having a ionic pendant group X and two reaction-enabling substituents Y, the dispersed phenolic resin reaction product contains a mixture of oligomers having structures believed to be represented by the following formula IV:

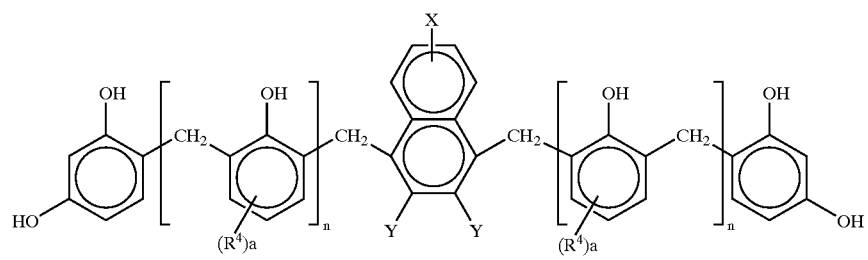

wherein X and Y are the same as in formulae Ia and Ib, a is 0 or 1, n is 0 to 5 and $R^4$ is independently hydroxyl, alkyl, aryl, alkylaryl or aryl ether. Preferably, $R^4$ is tert-butyl. If 6,7-dihydroxy-2-naphthalenesulfonate, sodium salt is the modifying agent, X will be $SO_3^-$ $Na^+$ and each Y will be OH. In this case the hydroxy groups for Y will also act as chelating groups with a metal ion.

It should be recognized that the dispersed phenolic resin reaction product may also contain oligomers or compounds having structures that vary from the idealized structures shown in formula IV.

If the modifying agent includes a sulfur-containing ionic group, the resulting modified phenolic resin should have a carbon/sulfur atom ratio of 20:1 to 200:1, preferably 20:1 to 100:1. If the sulfur content is greater than the 20:1 carbon/sulfur atom ratio, the modified phenolic resin begins to become water soluble, is more stable with respect to multivalent ions and is difficult to thermoset. These characteristics are adverse to the preferred use of the preferred phenolic resin dispersion of the invention. If the sulfur content is below the 200:1 carbon/sulfur atom ratio, then the preferred resin dispersion cannot maintain its stability. Viewed another way, the dispersed phenolic resins have 0.01 to 0.10, preferably 0.03 to 0.06, equivalents of sulfonate functionality/100 g resin. The aqueous dispersion of the phenolic resin preferably has a solids content of 1 to 50, preferably 15 to 30.

The modifying agent and the phenolic resin precursor can be reacted under conditions effective to promote condensation of the modifying agent with the phenolic resin precursor. The reaction is carried out in water under standard phenolic resin condensation techniques and conditions. The reactant mixture (including water) generally is heated from 50 to 100° C. under ambient pressure, although the specific temperature may differ considerably depending upon the specific reactants and the desired reaction product. The resulting product is a concentrate that is self-dispersible upon the addition of water and agitation to reach a desired solids content. The final dispersion can be filtered to remove any gelled agglomerations.

The intermediate modified resoles or novolaks that are initially produced in the synthesis are not necessarily water dispersible, but as the chain extension is advanced the resulting chain extended modified resoles or novolaks become progressively more water dispersible by simple mechanical agitation. The chain extension for the dispersed resole is determined by measuring the viscosity of the reaction mixture. Once the resole reaction mixture has a reached the desired viscosity, which varies depending upon the reactant composition, the reaction is stopped by removing the heat. The chain extension for the dispersed novolak is determined by pre-selecting the F/P ratio of the total reaction mixture (in other words, the amount of aldehyde compound(s) relative to the amount of phenolic(s) in both the first and second stages). The reaction for the novolak is allowed to proceed until substantially all the total amount of the reactants have reacted. In other words, there is essentially no unreacted reactant remaining. Preferably, the molecular weight (i.e., chain extension) of the novolak should be advanced to just below the gel point.

The coating forming component can be present in the metal treatment composition in any amount. Preferably, it is present in an amount of 10–90, preferably 20–80%, more preferably 30–60%, based on the dry weight of the metal treatment conversion coating component.

The conversion coating that forms from the metal treatment conversion coating component forms an environmentally (especially corrosion) resistant, non-resolvatable coating when applied to a metal surface and cured. As used herein, "non-resolvatable" means that the coating does not resolvate when the aqueous protective coating component is applied to the film before it is thermoset. If the coating resolvated, the components of the coating would dissolve or disperse into the aqueous protective coating component thus destroying any advantage intended from the formation of the coating on a surface. The low ionic content of the preferred modified phenolic novolak resin dispersion (relative to water soluble phenolic resins) allows them to behave similarly to non-ionically modified resins and form very water resistant films on curing.

Accelerators may also be present in the aqueous metal treatment conversion coating component. Accelerators are generally used in conversion coatings to provide increased corrosion resistance. In the present invention, the inclusion of the blister control agent in the subsequently applied aqueous protective coating reduces or in some cases even eliminates the requirement of an accelerator in the aqueous metal treatment conversion coating component.

Accelerating agents that can be used in the conversion coating can include any chemical that acts as an oxidizing agent and is capable of reacting with hydrogen formed at the surface of the metal, including those termed as reducing accelerators. Suitable accelerating agents can include hydroxylamine, bromates, chlorates, nitrates, nitrites, peroxides, organic nitro-compounds, oxo-nitrogen compounds and oximes, tungsten and molybdenum compounds (molybdic and tungstic acid compounds, molybdic acid, tungstic acid, their anhydrides and their water soluble salts), perchlorates, chlorites and perborates. Also suitable are the compounds discussed in connection with the blister suppressing agent described below. These and other suitable accelerators are described in U.S. Pat. Nos. 4,149,909 and 2,502,441 5,711,996 and Freeman, *Phosphating and Metal Pretreatment*, Industrial Press Inc., 1986, all of which are incorporated in their entireties. The accelerator may be present in an amount of 0.1 to 20 wt %, preferably 0.5 to 10 wt %, more preferably 1.0 to 5 wt %, based on the dry weight of the metal treatment conversion coating component.

Water, preferably deionized water, is utilized in the aqueous metal treatment conversion coating component of the invention in order to vary the solids content. Although the solids content may be varied as desired, the solids content of the metal treatment composition typically is 1 to 15 wt %, preferably 5 to 10 wt %. Since the aqueous conversion coating component is waterborne it is preferably substantially free of volatile organic compounds. The resulting coating from application of the aqueous metal treatment conversion coating component is a thin, tightly bound interpenetrating matrix of coating forming component/metal phosphate/oxide at the metal substrate interface. This matrix can be further flexibilized with polymers. The flexibilizer is any material that contributes flexibility and/or toughness to the film formed from the composition. The toughness provided by the flexibilizer provides fracture resistance to the coating. The flexibilizer should be non-glassy at ambient temperature and be an aqueous emulsion latex or aqueous dispersion that is compatible with the other components of the coating such as the preferred phenolic novolak resin dispersion. The flexibilizer preferably is formulated into the composition in the form of an aqueous emulsion latex or aqueous dispersion.

Suitable flexibilizers include aqueous lattices, emulsions or dispersions of (poly)butadiene, neoprene, styrene-butadiene rubber, acrylonitrile-butadiene rubber (also known as nitrile rubber), halogenated polyolefin, acrylic polymer, urethane polymer, ethylene-propylene copolymer rubber, ethylene-propylene-diene terpolymer rubber, styrene-acrylic copolymer, polyamide, poly(vinyl acetate) and the like. Halogenated polyolefins, nitrile rubbers and styrene-acrylic copolymers are preferred. Further examples of suitable flexibilizers can be found in copending application Ser. No. 09/235,201. If present, the flexibilizer may be present in an amount of 5 to 300 wt %, preferably 25 to 100 wt %, based on the total amount of coating forming component.

The aqueous metal treatment conversion coating component may be prepared by any method known in the art, but are preferably prepared by combining and milling or shaking the ingredients and water in ball-mill, sand-mill, ceramic bead-mill, steel-bead mill, high speed media-mill or the like.

It is preferred to add each component to the mixture in a liquid form such as an aqueous dispersion.

The aqueous metal treatment conversion coating component may be applied to a substrate surface by any conventional method such as spraying, dipping, brushing, wiping, roll-coating (including reverse roll-coating) or the like, after which the conversion coating component typically is permitted to dry. Although conventional application methods can be used, the aqueous metal treatment conversion coating component can be applied via autodeposition. The preferred phenolic resin dispersion of the aqueous metal treatment conversion coating component enables autodeposition of the conversion coating component on an electrochemically active metallic surface. Autodepositable compositions usually are applied by dipping the metallic substrate or part into a bath of the composition. The metal substrate can reside in the metal treatment composition bath for an amount of time sufficient to deposit a uniform of desired thickness. Typically, the bath residence time is from about 5 to about 120 seconds, preferably about 10 to about 30 seconds, and occurs at room temperature. The aqueous metal treatment conversion coating component when it is applied to the metal substrate should be sufficiently acidic to cause reaction with the metal to liberate the metallic ions. Typically, the pH of the metal treatment composition should be 1 to 4, preferably 1.5 to 2.5, when it is applied to the metal substrate. The composition typically is applied to form a dry film thickness of 1 to 15, preferably 4 to 10 $\mu$m. After simple forced air drying of a metal surface coated with the aqueous metal treatment conversion coating component the metal surface can be immediately coated with the aqueous protective coating component. The coated metal substrate typically is dried by subjecting it to heat and forced air. Depending upon the forced air flow, the drying usually occurs at approximately 200–250° F. for a time period ranging from 30 seconds to 10 minutes. The ambient staging period previously required after such heated drying is no longer necessary. However, immediate subsequent coating of the treated metal substrate is not required. Alternatively, the treated metal substrate can be stored for a period of time and then subsequently coated with the protective coating composition.

The present invention also includes an aqueous protective coating component that is applied over a metal substrate that has been treated with the aqueous metal treatment conversion coating component described above.

As described above, when the acid in a conversion coating attacks the metal surface of the substrate, hydrogen is formed. The use of an accelerator acts as an oxidizing agent and reacts with the formed hydrogen. If the level or amount of accelerator is low, blistering can be a particular problem when a subsequent coating is applied. This is believed to be due to the free acid still in the system reacting with the metal substrate. Because of the now much thicker coating, any hydrogen liberated has difficulty diffusing through the thicker coating and hence causes blistering. Higher levels of accelerator in the metal treatment suppresses blistering: however, higher levels are often undesirable, causing unacceptably fast deposition of the conversion coat.

The inventor has found that by including a blister suppressing agent, such as an oxidizing agent, in the subsequently applied protective coating, the blister suppressing agent in the protective coating, can diffuse to the surface of the metal and oxidize the formed hydrogen, thus reducing or even eliminating blister formation. The presence of the blister suppressing agent in the protective coating, allows the use of low levels or even no levels of accelerator in the metal treatment conversion coating-component.

Aside from blistering, the inclusion of an oxidizer in a subsequent protective coating composition results in the coating having an excellent appearance and corrosion resistance, regardless of the presence or level of an accelerating agent in the first coat.

Moreover, if the blister suppressing agent is an oxidizing agent that is able complete the conversion reaction during the application of the aqueous protective coating component, then, as noted above, it is possible to reduce or in some instances completely forego the use of accelerators in the aqueous metal treatment conversion coating component.

Thus, the inclusion of an blister suppressing agent in a coating that is applied subsequent to a conversion coating has benefits regardless of whether there is an accelerator in the conversion coating, or whether there is blistering caused by the hydrogen. However, the use of an aqueous metal treatment conversion coating component with some accelerator together with a subsequent coating containing a blister suppressing agent is preferred.

As used herein, "blister suppressing agent" is defined as any material which reduces or eliminates blister formation in the protective coating. Suitable blister suppressing agents include accelerators typically used in conversion coating compositions, such as the accelerators described above with respect to the metal treatment conversion coating component, both those known as oxidizing and reducing accelerators. Preferred blister suppressing agents include organic oxidizing agents.

The organic oxidizing agents can include organic nitro compounds, oximes and oxo-nitrogen compounds. Particularly preferred organic oxidizing agents can include nitroguanidine; aromatic nitrosulfonates, Naphthol Yellow S; and picric acid (trinitrophenol). Preferred aromatic nitrosulfonates include nitro or dinitrobenzenesulfonate and the salts thereof, such as sodium nitrobenzensulfonate. The blister suppressing agents can be used alone or in mixtures. Particularly preferred mixtures include nitroguanidine and sodium nitrobenzenesulfonate. The blister suppressing agent may be present in an amount of 0.1 to 20 wt %, preferably 0.2 to 10 wt %, based on the dry weight of the metal treatment conversion coating component.

The protective coating component also includes an organic film forming protective component that is able to form a protective film on the aqueous metal treatment conversion coating component. This can include any water-dispersible or emulsifiable film-forming resin that can deposit an adherent coating on the aqueous metal treatment conversion coating component. Examples include thermosetting resins such as urethanes, amino resins, acrylic resins, alkyd resins, epoxy resins, phenolic resins, cyclized olefin rubbers, halogenated polyolefins, halo-sulfonated polyolefins, polyester resins, polybutadiene rubbers, natural resins, and mixtures thereof.

Particularly preferred are autodepositable resins. The autodepositable resins described above with respect to the aqueous metal treatment conversion coating component can be used, such as derived ethylenicially unsaturated monomers such as polyvinylidene chloride, polyvinyl chloride, polyethylene, acrylic, acrylontrile, polyvinyl acetate and styrene-butadiene, urethane and polyester resins and certain epoxy and epoxy-acrylate resins. A particularly preferred autodepositable resin includes the dispersed phenolic resin as described above in connection with the preferred phenolic resin used with the aqueous metal treatment conversion coating component.

The organic film forming protective component may be present in an amount of up to 99 wt %, preferably 30 to 99 wt %, more preferably 75 to 99 wt %, based on the dry weight of the metal treatment conversion coating component.

The aqueous protective coating component can be any coating known to protect the underlying metal substrate and prepare it for further treatment, such as application of adhesive or paint, or provide for an aesthetically pleasing appearance or texture. Of course, the blister suppressing agent must be added to the known coating compositions.

Preferably, the aqueous protective coating component is a functional autodepositable coating using the autodepositable resins described above, such as an adhesive primer or overcoat, particularly an adhesive primer or covercoat that is useful for bonding an elastomeric substrate to a metal substrate, in which the conversion coating composition serves as a protective coating under the subsequently applied functional autodepositable coating. Even more preferably, the aqueous protective coating component is a primer or adhesive topcoat that includes the dispersed phenolic resin as described above in connection with the preferred phenolic resin used with the aqueous metal treatment conversion coating component. In this instance, the conversion coating component can activate a metal surface for autodeposition of the subsequently applied coating, primer or adhesive topcoat. Such a preferred primer is described in more detail in co-pending, commonly assigned U.S. patent application Ser. No. 09/235,778 filed Jan. 22, 1999, now U.S. Pat. No. 6,476,119 incorporated herein by reference. In addition to enhancing the corrosion resistance as explained above, autodeposition activity of the subsequent coating over the conversion coating composition is substantially increased according to the invention.

Although preferred, the preferred adhesive primer or overcoat applied as the aqueous protective coating component over the conversion coating component does not have to be autodepositable. Conventional, non-autodepositable primers or covercoats can be used in the present invention. Especially useful are known elastomer-to-metal adhesive primers or covercoats such as those described in U.S. Pat. Nos. 3,258,388; 3,258,389; 4,119,587; 4,167,500; 4,483,962; 5,036,122; 5,093,203; 5,128,403; 5,200,455; 5,200,459; 5,268,404; 5,281,638; 5,300,555; and 5,496,884, all incorporated by reference in their entireties. Elastomer-to-metal adhesive primers and covercoats are commercially available from Lord Corporation.

The aqueous protective coating component also includes water, preferably deionized water, to vary the solids content. Although the solids content may be varied as desired, the solids content of the aqueous protective coating component typically is 5 to 50, preferably 8 to 15 wt %. Since the aqueous protective coating component is waterborne it is preferably substantially free of volatile organic compounds.

For some organic film forming protective components, the inclusion of a flexibilizer may be desirable. Flexibilizers can include those described above and in U.S. patent application Ser. No. 09/235,778 now U.S. Pat. No. 6,476,119. If present, the flexibilizer may be present in an amount of 5 to 300 wt %, preferably 25 to 100 wt %, based on the total amount of the organic film forming protective component.

The aqueous protective coating component can also include conventional additives such as inert filler material, pigments, plasticizers, dispersing agents, wetting agents, reinforcing agents and the like in amounts conventionally utilized. Examples of such conventional additives include carbon black, silica, sodium aluminosilicate, titanium dioxide and organic pigments and dyestuffs. The aqueous protective coating component preferably does not include an acid.

The aqueous protective coating component can also include conventional additives known to be useful in adhesive compositions, such as metal oxides that can include zinc oxide, magnesium oxide, lead oxide, iron oxide, cadmium oxide, zirconium oxide and calcium oxide, with zinc oxide and magnesium oxide being preferred. Another useful ingredient is mica.

The aqueous protective coating component can be applied using the same techniques as described above with respect to the metal treatment coating component. The protective coating can be dried under the conditions described above.

Reference will now be made to the non-limiting examples described below.

EXAMPLES

The following ingredients were mixed together to obtain an autodepositable metal treatment conversion coating component.

| Metal Treatment Conversion Coating Component | | | |
|---|---|---|---|
| Material | % solids | Wet Weight in Parts | Description |
| Novolac Dispersion | 20% | 100 | Sulfonate functional novolac dispersion |
| Phosphoric Acid | 85% | 10 | Acid |
| Nitroguanidine | 75% | 0.3 | Accelerator |
| Hycar 1578x1 | 50% | 20 | Nitrile elastomer dispersion |
| Deionized Water | | 360 | |
| Total | | 490.3 | |
| % solids | 8% | | |

The metal treatment was prepared by dissolving the nitroguanidine in the 100 g of the diluent water, diluting the phosphoric acid to 10% with diluent water, adding the remaining diluent water to the novolac resin with excellent stirring, and adding all the prediluted components to give the final diluted metal treatment.

| Novolac Dispersion used above | | | |
|---|---|---|---|
| Material | % solids | Weight in Parts | |
| FBS | 75% | 20 | 2-formylbenzene sulfonate, sodium salt |
| Formalin | 37% | 144 | Formaldehyde solution |
| Pyrogallol | 100% | 40 | |
| Resorcinol | 100% | 180 | |
| Phosphoric Acid | 85% | 10 | |
| Water | | 1100 | |
| Total | | 1494 | |
| % solids | 20% | | |

Novolac resin dispersion is prepared by dissolving the pyrogallol/resorcinol in 250 g of the water in a 2000 ml resin kettle with stirrer, nitrogen inlet, reflux condenser. Add the phosphoric acid, bring to 95° C. and slowly add 75% of the formalin solution. Then added the FBS and continued heating for 15 minutes followed by slow addition of the remaining formalin. Continue heating at 95° C. for 30 minutes after the addition is completed, added the remaining diluent water, filter and package.

The following ingredients were mixed together to obtain an autodepositable aqueous protective coating component.

Aqueous Protective Coating Component

| Material | % Solids | Wet Weight in parts | Description |
|---|---|---|---|
| GP-4000 | 45% | 93 | Phenolic Dispersion Resin from Georgia Pacific Corp |
| Hycar 1578x1 | 25% | 100 | Nitrile elastomer dispersion from B F Goodrich |
| Raven 14 | 10% | 20 | Carbon Black predispersed in water with 5% on solids of Marsperse dispersant |
| Nitroguanidine | 75% | 0.5 | |
| Water | | 400 | |
| | | 613.5 | |
| % Solids | 11.5% | | |

The above coating was prepared by simply mixing all the dispersions with diluent water. A second protective coating was prepared as above but without the nitroguanidine in the coating.

Steel Q-panels were dipped in a bath of the metal treatment conversion coating composition at 8% solids for 60 seconds. The metal treatment composition formed a continuous wet film on the steel coupon surface indicating successful autodeposition. The treated coupons then were dried at 200 F. The dried treated coupons are then dipped in a bath of the protective coating component at 11.5% solids for 15 seconds. The protective coating composition forms a continuous wet film on the steel coupon surface indicating successful autodeposition. The coated coupons are then dried for 15 minutes at 200° F. This process is repeated for both the nitroguanidine free and nitroguanidine containing protective coating.

The nitroguanidine containing coating gives an excellent appearing, blister free coating, while the nitroguanidine free system shows substantial blistering over the surface of the coating.

Another suitable embodiment includes the components of the example described above, with the novolak dispersion of the aqueous metal treatment conversion coating replaced by a dispersed novolak resin made by reacting 6,7-dihydroxy-2-naphthalenesulfonate, sodium salt (available from Andrew Chemicals), a water soluble resole (made from formaldehyde and phenol, PIP ratio of 2.3, 80% solids and commercially available from Schenectady under the trade designation HRJ11722), catechol, and water until viscous, followed by further reacting with phosphoric acid, water and resorcinol, followed by further reacting with formalin, followed by diluting the reacted concentrate in water as described above and in copending U.S. patent application Ser. No. 09/235,201 now U.S. Pat. No. 6,353,307.

While a preferred embodiment of the present invention has been described, it should be understood that various changes, adaptation in modification may be made therein without departing from the spirit of the invention and the scope of the appended claims.

As used herein and in the following claims, articles such as "the," "a," and "an" can connote the singular or plural.

All documents referred to herein are specifically incorporated herein by reference in their entireties.

I claim:

1. A two-part metal protection composition comprising:
   an aqueous metal treatment conversion coating component that comprises an admixture of an acid, an accelerator, and an organic coating forming component; and
   an aqueous protective coating component that is applied over metal treated with the aqueous metal treatment conversion coating component and comprises an admixture of a blister suppressing agent and an organic film forming protective component.

2. A two-part metal protection composition according to claim 1, wherein the coating forming component of the aqueous metal treatment conversion coating component comprises an organic compound.

3. A two-part metal protection composition according to claim 2, wherein the organic compound of the coating forming component comprises a phenolic compound.

4. A two-part metal protection composition according to claim 3, wherein the phenolic compound of the coating forming component comprises an aqueous dispersion of a phenolic novolak resin that includes a reaction product of
   (i) a phenolic resin precursor;
   (ii) a modifying agent wherein the modifying agent includes;
       (a) at least one functional moiety that enables the modifying agent to react with the phenolic resin precursor;
       (b) at least one ionic moiety; and
   (iii) at least one multi-hydroxy phenolic compound.

5. A two-part metal protection composition according to claim 4, wherein the modifying agent comprises a structure represented by formula a or Ib:

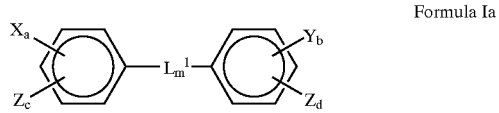

Formula Ia

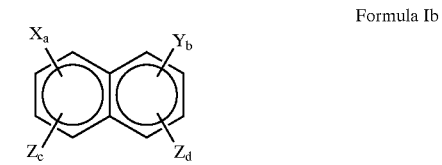

Formula Ib wherein X is the ionic moiety; Y is the reaction-enabling moiety; Z is a chelating substituent; $L^1$ is a divalent linking group; a is 1; b is 1 to 4; m is 0 or 1; and c and d are each independently 0 to 3, provided there are not more than 4 substituents on each aromatic ring.

6. A two-part metal protection composition according to claim 1, wherein the organic film forming protective component further comprises one or more of polyurethanes, amino resins, acrylic resins, alkyd resins, epoxy resins, epoxy-acrylate resins, phenolic resins, cyclized olefin rubbers, halogenated polyolefins, halo-sulfonated polyolefins, polyester resins, polybutadiene rubbers, styrene-butadiene, polyvinyl alcohol resins, natural resins, and resins derived from ethylenicially unsaturated monomers.

7. A two-part metal protection composition according to claim 1, wherein the organic film forming protective component comprises a phenolic compound.

8. A two-part metal protection composition according to claim 7, wherein the phenolic compound of the aqueous protective coating component comprises an aqueous dispersion of a phenolic novolak resin that includes a reaction product of:
   (i) a phenolic resin precursor;
   (ii) a modifying agent wherein the modifying agent includes;

(a) at least one functional moiety that enables the modifying agent to react with the phenolic resin precursor;
(b) at least one ionic moiety; and
(iii) at least one multi-hydroxy phenolic compound.

9. A two-part metal protection composition according to claim 8, wherein the modifying agent comprises a structure represented by formula a or Ib:

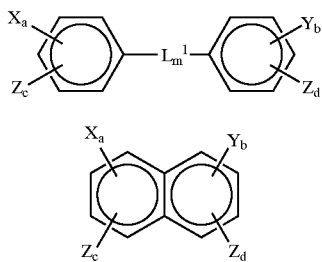

Formula Ia

Formula Ib wherein X is the ionic moiety; Y is the reaction-enabling moiety; Z is a chelating substituent; $L^1$ is a divalent linking group; a is 1; b is 1 to 4; m is 0 or 1; and c and d are each independently 0 to 3, provided there are not more than 4 substituents on each aromatic ring.

10. A two-part metal protection composition according to claim 8, wherein the aqueous metal treatment conversion coating component and the aqueous protective coating component are autodepositable.

11. A two-part metal protection composition according to claim 1, wherein the aqueous protective coating component further comprises a flexibilizer.

12. A two-part metal protection composition according to claim 1, wherein the aqueous metal treatment conversion coating component further comprises a flexibilizer.

13. A two-part metal protection composition according to claim 1, wherein the acid comprises one or more of hydrofluoric acid, phosphoric acid, sulfuric acid, hydrochloric acid, phosphonic acid, phosphorous acid, organo-phosphonic acids, organo-phosphorous acid, organo-phosphonate acid, hypophosphorous acid, inorganic and organic phosphoric acid esters and nitric acid.

14. A two-part metal protection composition according to claim 1, wherein the acid comprises one or more of phosphoric acid and hydrofluoric acid.

15. A two-part metal protection composition according to claim 1, wherein the accelerator comprises hydroxylamine, bromates, chlorates, nitrates, nitrites, peroxides, organic nitro-compounds, oxo-nitrogen compounds, oximes, tungsten and molybdenum compounds, perchlorates, chlorites and perborates.

16. A two-part metal protection composition according to claim 1, wherein the accelerator comprises hydroxylamine.

17. A two-part metal protection composition according to claim 1, wherein the blister suppressing agent comprises an oxidizing agent.

18. A two-part metal protection composition according to claim 1, wherein the aqueous metal treatment conversion coating component further comprises an accelerator and wherein the blister suppressing agent comprises an organic oxidizing agent that includes one or more of organic nitro compounds, oximes and oxo-nitrogen compounds.

19. A two-part metal protection composition according to claim 18, wherein the organic oxidizing agent comprise an organic nitro compound.

20. A two-part metal protection composition according to claim 19, wherein the organic nitro compound comprises one or more of nitroguanidine; aromatic nitrosulfonates; Naphthol Yellow S; and picric acid (trinitrophenol).

21. A two-part metal protection composition according to claim 20, wherein the aromatic nitrosulfonate comprises nitro or dinitrobenzenesulfonate and the salts thereof.

22. A two-part metal protection composition according to claim 21, wherein the aromatic nitrosulfonate comprises nitrobenzenesulfonate and the salts thereof.

23. A two-part metal protection composition according to claim 22, wherein the organic nitro compound comprises a mixture of nitroguanidine and sodium nitrobenzenesulfonate.

24. A two-part metal protection composition according to claim 23, wherein the accelerator comprises hydroxylamine.

25. A two-part metal protection composition according to claim 19, wherein the accelerator comprises hydroxylamine.

26. A method for treating a metallic surface comprising:
(a) applying an aqueous metal treatment conversion coating component that comprises an admixture of an acid, an accelerator, and an organic coating forming component; and
(b) applying an aqueous protective coating component to the surface that has at least been partially treated with the aqueous metal treatment conversion coating component and comprises an admixture of a blister suppressing agent and an organic film forming protective component.

27. A method according to claim 26, further comprising: (a1) drying the aqueous metal treatment conversion coating component before applying the aqueous protective coating component.

28. A method according to claim 26, wherein the coating forming component comprises an organic compound.

29. A method according to claim 28, wherein the organic compound of the coating forming component comprises a phenolic compound.

30. A method according to claim 29, wherein the aqueous protective coating component further comprises one or more phenolic compounds.

31. A method according to claim 30, wherein the aqueous protective coating component further comprises a flexibilizer.

32. A method according to claim 26, wherein the aqueous protective coating component is a primer coating.

33. A method according to claim 26, wherein the accelerator comprises hydroxylamine, bromates, chlorates, nitrates, nitrites, peroxides, organic nitro-compounds, oxo-nitrogen compounds, oximes, tungsten and molybdenum compounds, perchlorates, chlorites and perborates.

34. A method according to claim 26, wherein the accelerator comprises hydroxylamine.

35. A method according to claim 26, wherein the blister suppressing agent comprises an oxidizing agent.

36. A method according to claim 26, wherein the aqueous metal treatment conversion coating component further comprises an accelerator and wherein the blister suppressing agent comprises an organic oxidizing agent that includes one or more of organic nitro compounds, oximes and oxo-nitrogen compounds.

37. A method according to claim 36, wherein the organic oxidizing agent comprises an organic nitro compound.

38. A method according to claim 37, wherein the organic nitro compound comprises one or more of nitroguanidine; aromatic nitrosulfonates, Naphthol Yellow S; and picric acid (trinitrophenol).

39. A method according to claim 38, wherein the aromatic nitrosulfonate comprises nitro or dinitrobenzenesulfonate and the salts thereof.

40. A method according to claim 39, wherein the aromatic nitrosulfonate comprises nitrobenzenesulfonate and the salts thereof.

41. A method according to claim 40, wherein the organic nitro compound comprises a mixture of nitroguanidine and sodium nitrobenzenesulfonate.

42. A method according to claim 41, wherein the accelerator comprises hydroxylamine.

43. A method according to claim 37, wherein the accelerator comprises hydroxylamine.

44. A method for bonding an elastomeric substrate surface to a metallic substrate surface comprising:
   (a) applying an aqueous metal treatment conversion coating component to the surface wherein the aqueous metal treatment conversion coating component comprises an admixture of an acid, an accelerator, and an organic coating forming component;
   (b) applying an aqueous coating or primer composition to the surface that has at least been partially treated with the aqueous metal treatment conversion coating component and comprises an admixture of a blister suppressing agent and an organic film forming protective component; and
   (c) applying an adhesive overcoat to effect bonding of the metallic substrate to the elastomeric substrate.

45. A method according to claim 44, wherein the aqueous metal treatment conversion coating component and the aqueous coating or primer are autodepositable.

* * * * *